(12) United States Patent
Curtis et al.

(10) Patent No.: US 6,275,172 B1
(45) Date of Patent: Aug. 14, 2001

(54) METHOD AND APPARATUS FOR IMPROVING PERFORMANCE OF AIRCRAFT DISPLAY UTILIZING TCAS COMPUTER AND MODE S TRANSPONDER

(75) Inventors: Michael H. Curtis, Glendale; Kenneth C. Reeves, Peoria; Desi D. Stelling, Phoenix, all of AZ (US)

(73) Assignee: L-3 Communications Corporation, Phoenix, AZ (US)

( * ) Notice: Subject to any disclaimer, the term of this patent is extended or adjusted under 35 U.S.C. 154(b) by 0 days.

(21) Appl. No.: 08/609,074

(22) Filed: Feb. 29, 1996

(51) Int. Cl.[7] ....................................................... G08G 5/04
(52) U.S. Cl. ............................. 340/961; 342/29; 701/301
(58) Field of Search ................................ 340/961, 963, 340/945; 342/29, 30; 364/461; 701/301

(56) References Cited

U.S. PATENT DOCUMENTS

| | | | |
|---|---|---|---|
| 4,167,006 | 9/1979 | Funatsu et al. | 364/461 |
| 4,782,450 | 11/1988 | Flax | 364/461 |
| 4,914,733 | 4/1990 | Gralnick | 342/29 |
| 5,111,400 | * 5/1992 | Yoder | 342/29 |
| 5,157,615 | 10/1992 | Brodegard et al. | 342/30 |

* cited by examiner

Primary Examiner—Brent A. Swarthout
(74) Attorney, Agent, or Firm—William R. Bachand; Stuart A. Whittington; Squire, Sanders & Dempsey LLP

(57) ABSTRACT

An improved TCAS indicating system and method for displaying information from the MODE S TRANSPONDER or other subsystem, directly to the TCAS DISPLAY by coding the information and programming the TCAS COMPUTER and the MODE S TRANSPONDER to pass the coded information through to the TCAS DISPLAY.

7 Claims, 5 Drawing Sheets

METHOD AND APPARATUS FOR IMPROVING PERFORMANCE OF AIRCRAFT DISPLAY UTILIZING TCAS COMPUTER AND MODE S TRANSPONDER

BACKGROUND OF THE INVENTION

1. Field of the Invention

The present invention relates to aircraft displays and more particularly to improving the capability of presently existing cockpit displays used to display information generated by a traffic alert and collision avoidance system (identified as TCAS) having a TCAS COMPUTER and a MODE S TRANSPONDER.

2. Description of the Prior Art

Many present day aircraft utilize TCAS to display own aircraft and the relative positions and altitudes of other aircraft in the area on a cockpit display for use by the pilot. The TCAS COMPUTER receives information concerning own aircraft from a TRANSPONDER identified as a MODE S TRANSPONDER and receives information concerning other aircraft from their transponders. One description of such a system can be found in copending application of Stayton et al, Ser. No, 08/504977, filed Jul. 20, 1995 and assigned to the assignee of the present invention.

In addition to display of aircraft positions, the TCAS system can display data generated and contained in the TCAS COMPUTER such as system test information. A control panel connected to the MODE S TRANSPONDER provides switch commands which enable transfer of information from the TRANSPONDER to the TCAS COMPUTER which operates on the information to produce a display. Additional subsystems, such as an air data computer (ADC) or a flight management system (FMS) may also be connected to the MODE S TRANSPONDER or the TCAS COMPUTER. The MODE S TRANSPONDER or the additional subsystems produce information that may be used by the TCAS COMPUTER for generating information used in producing a display.

The MODE S TRANSPONDER stores information concerning failures and other internal information which may be used by maintenance personnel. In the past, maintenance personnel were required to remove the TRANSPONDER from the aircraft and send it to a maintenance facility to check and correct any problems. In addition, new programs are occasionally introduced for use by the MODE S TRANSPONDER and in order to employ these, the TRANSPONDER is removed from the aircraft so that the programs may be added to the TRANSPONDER and verified at a remote location before reinstalling.

Because it is time consuming and expensive to remove and operate on the TRANSPONDER at a remote location, a maintenance computer has been developed to be used on the aircraft for purposes of checking all of the aircraft systems including TCAS. For example, the maintenance computer can check MODE S TRANSPONDER failure data or can perform software verification. The problem with this solution is that the cost involved with installing a maintenance computer on the aircraft is high and the space taken up by the computer is undesirable.

SUMMARY OF THE INVENTION

The present invention solves the problem of removing MODE S TRANSPONDERS or other TCAS subsystems and operating on them at a remote location without the use of a costly space consuming maintenance computer by utilizing equipment already existing in the TCAS system. More particularly, the TCAS COMPUTER is modified by re-programming it so that it can pass data from the MODE S TRANSPONDER or other TCAS subsystems to the TCAS DISPLAY directly upon entering a unique command from the control panel. Thus, internal data such as those indicative of failures or externally derived data such as the ADC and FMS data can be displayed on the TCAS DISPLAY.

DETAILED DESCRIPTION OF THE PREFERRED EMBODIMENT

Figure 1:
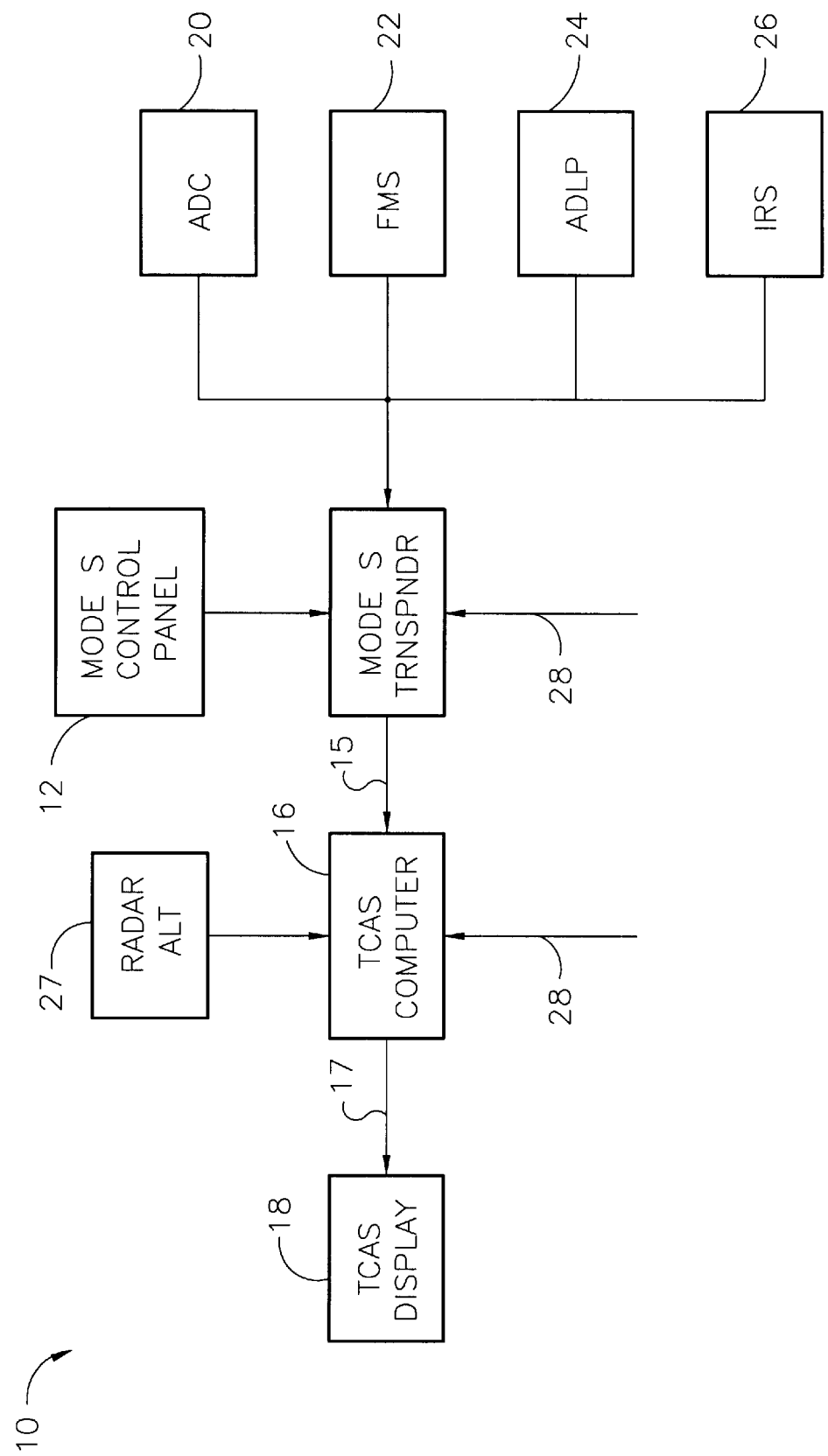
FIG. 1 is a block diagram of a TCAS system.

In FIG. 1, a TCAS system 10 is shown comprising a MODE S CONTROL PANEL 12, a MODE S TRANSPONDER 14, a TCAS COMPUTER 16 and a TCAS DISPLAY 18 which is preferably of the standard VSI/TMA type. Normally two MODE S TRANSPONDERS are employed but for simplicity, only one is shown in FIG. 1. The TRANSPONDER 14 also has other inputs such as an Air Data Computer (ADC) 20, a Flight Management System (FMS) 22, an Airborne Data Link Processor (ADLP) 24 and an Inertial Reference System (IRS) 26. These are shown as examples and there may be as many other subsystems as desired. All of these subsystems are shown providing inputs to MODE S TRANSPONDER 14. In some cases, the TCAS COMPUTER 16 may receive data from a subsystem directly rather than through the MODE S TRANSPONDER. For example in FIG. 1, a radar altimeter shown by block 27 is shown directly connected to TCAS COMPUTER 16. The connections between the subsystems and the TCAS system and between the components of the TCAS system are generally via a specified data bus established by Aeronautical Radio Incorporated, (ARINC), for example, ARINC bus 429 XT 17.

MODE S TRANSPONDER 14 information is transferred over one ARINC bus 15 to the TCAS COMPUTER 16 which, in turn, operates on the data to produce an output on another ARINC bus 17 to the TCAS DISPLAY 18 to provide the pilot or maintenance personnel with the desired information. MODE S TRANSPONDER 14 is designed to accept ARINC 615 Portable Data Loader (PDL) inputs for ease in upgrading product software on board the aircraft. To this end, both the TCAS COMPUTER 16 and the MODE S TRANSPONDER 14 have ARINC 615 ports identified by arrows 28 to allow the upgrading programming of these devices on board the aircraft. In the past, such upgrading could not be verified in accordance with FAA requirements since there has been no way for the MODE S TRANSPONDER 14 to present a display showing the identity of the software it was using to provide the necessary verification. While a separate maintenance computer could be installed on board the aircraft to verify the reprograrnming, such equipment is extremely costly and undesirably space consuming.

Figure 2:
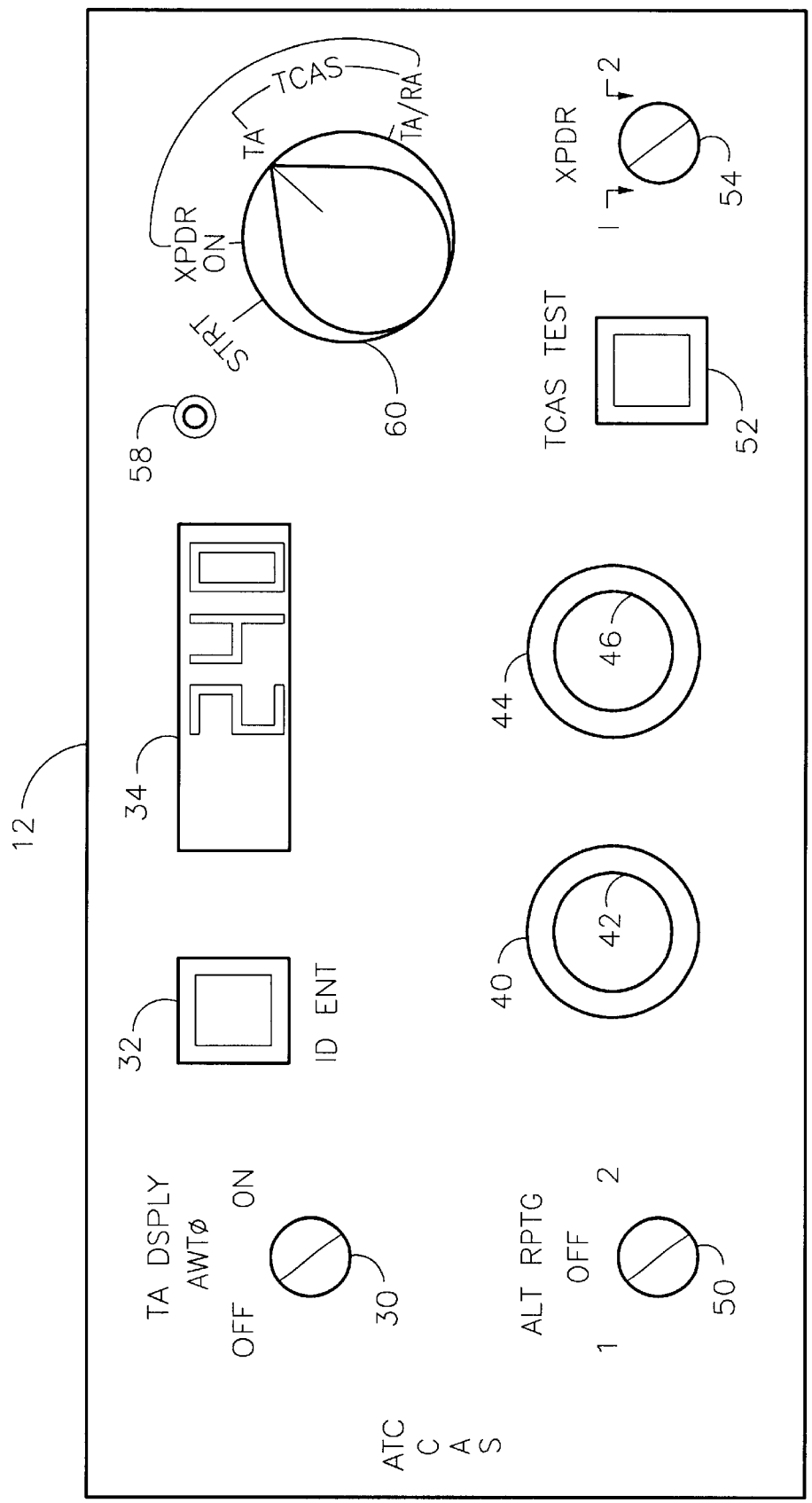
FIG. 2 is a showing of the TCAS CONTROL PANEL.

FIG. 2 shows an example of the front surface of a MODE S CONTROL PANEL 12. In FIG. 2 a display switch 30 operates to enable and disable certain primary TCAS DIS- PLAY functions; a push switch 32 labeled "IDENT" allows the pilot to identify his aircraft to a ground station when requested; a center display 34 shows the identity code or page to be observed on the TCAS DISPLAY and is settable by the pilot or maintenance personnel by use of 4 knobs 40, 42, 44 and 46. A three position switch 50 in the lower left corner allows the pilot to set one of two sources of altitude information to be displayed or to turn it off; a TCAS TEST switch 52 near the lower right corner allows the pilot or maintenance personnel to initiate a system test which has predetermined symbology on the display; a XPDR switch 54 allows the pilot or maintenance personnel to select which of two MODE S TRANSPONDERs to be used to produce the display; a FAIL light 58, to the upper right of display area 34, alerts the pilot to a failure in a TRANSPONDER. A switch 60 in the upper right corner has 4 positions: STBY which puts the MODE S TRANSPONDER selected on a standby but not on; XPDR ON in which the MODE S TRANSPONDER is activated; and, a TCAS area with two positions, TA and TA/RA. which identify various advisory modes.

Figure 3B:
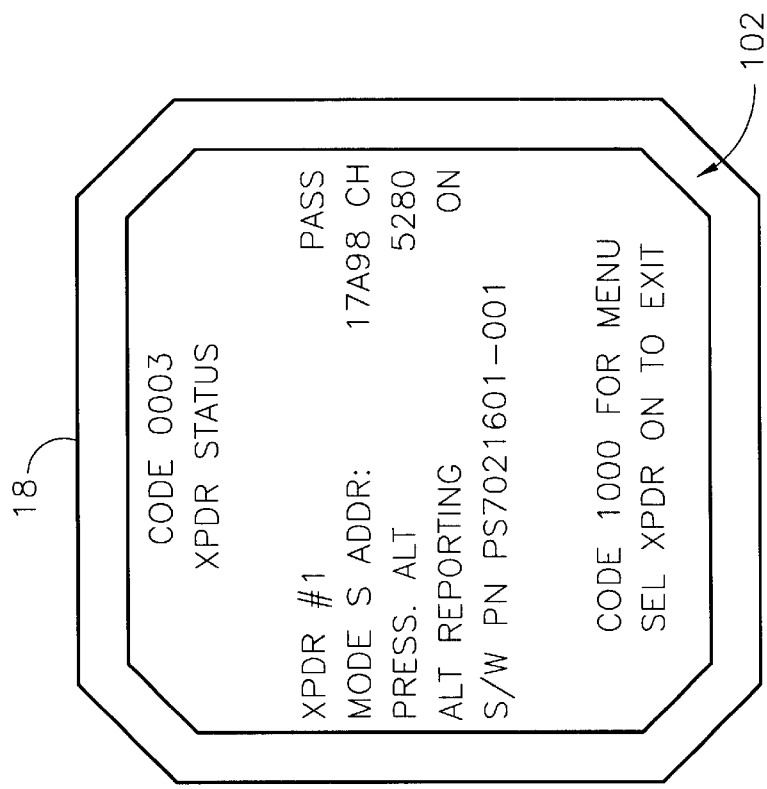
FIGS. 3a to 3d are showings of the TCAS DISPLAYS with information from the MODE S TRANSPONDER thereon; and, FIGS. 4a and 4b are flow diagrams showing how the present invention is implemented.
Figure 3A:
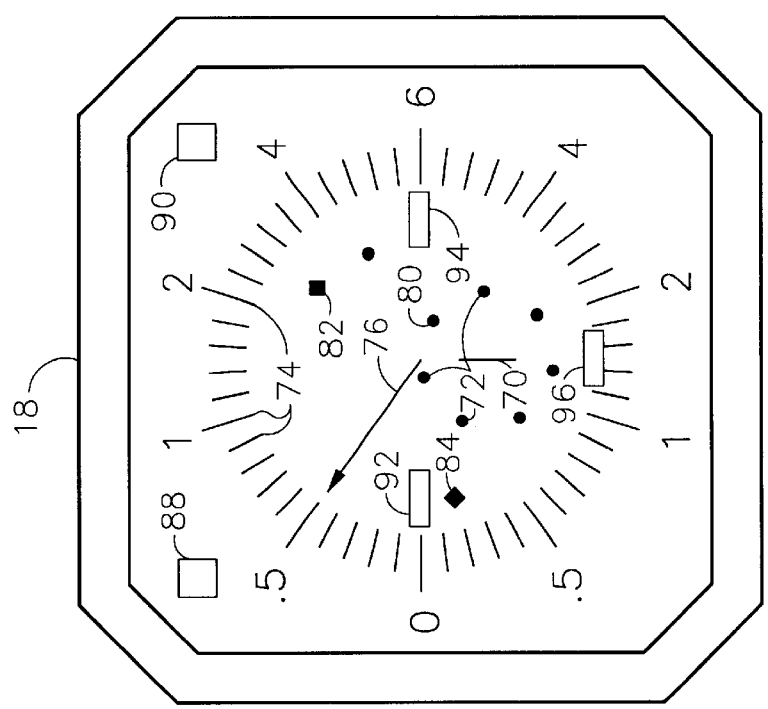

FIG. 3a shows the face of the TCAS DISPLAY when the aircraft is airborne and other intruder aircraft are in the area. In FIG. 3a, an aircraft symbol 70 is used to depict the position of own aircraft with a dotted circular area 72 therearound to depict, for example, a 2 nautical mile area. The indicia 74 around the periphery of the indicator and the pointer 76 show the aircraft's rate of change of altitude in hundreds of feet per minute. The portion above the indicia a, "0" and "6" show ascent while those below show descent. Other aircraft "intruders" 80, 82 and 84 are shown as circles, squares and diamonds on the display and are color coded to provide additional information. Each indicia tag has a two digit number with a + or − and an arrow pointing up or down to show the relative altitude difference between the intruder and own aircraft, whether the intruder is above or below own aircraft altitude and whether the intruder is climbing or descending above a predetermined rate. The rectangular areas 88, 90, 92 94 and 96 are reserved for text to display yet further information such as TCAS "on" and "off", or XPDR FAIL. All of the above functions and displays are generated by the TCAS COMPUTER 16 of FIG. 1 based upon information received from the MODE S TRANSPONDER. Further information concerning such display may be found in the above referred to copending patent application Ser. No. 08/504977.

With program changes such as the addition of a text transfer protocol, to the already present TCAS COMPUTER 16 and the MODE S TRANSPONDER 14, the present invention allows the TCAS COMPUTER to recognize predetermined codes from the MODE S TRANSPONDER or other directly connected subsystems and allows the MODE S TRANSPONDER 14 to recognize predetermined codes from the subsystems connected thereto so that upon receipt the desired information, such as the verification of upgraded programs, is passed through to the display. The use of the new display of the present invention is presently limited to "on ground" situations and may be activated by the pilot or maintenance personnel by positioning predetermined switches on the control panel 12. For example, when the "on ground" switch (not shown) on the aircraft is activated, the user may place the TCAS switch 60 to the "STBY" position and then press the TCAS TEST switch 52 for a predetermined period of time, e.g. eight seconds to prevent inadvertent activation, after which, the new display system is activated. Then by positioning the knobs 40. 42, 44 and 46 the user may select a desired display code or page number to appear on the display area 34 on the control panel 12. Then by pressing the IDENT switch, the appropriate desired display will appear on the TCAS DISPLAY 18. While over 4000 different codes may be so selected, only a few are presently in use on aircraft and so code selections which have no specific display associated therewith will produce a "menu" allowing the user to select the desire code for a system that is in use. Among the codes or page numbers that may be selected are not only data from the MODE S TRANSPONDER but also the other subsystems shown, i.e. data from the ADC 20, the FMS 22, the ADLP 24 and the IRS 26. The program change in the TCAS COMPUTER 16 and the MODE S TRANSPONDER 14 which allows this operation may be like shown in the flow diagrams of FIGS. 4a and 4b.

Figure 4A:
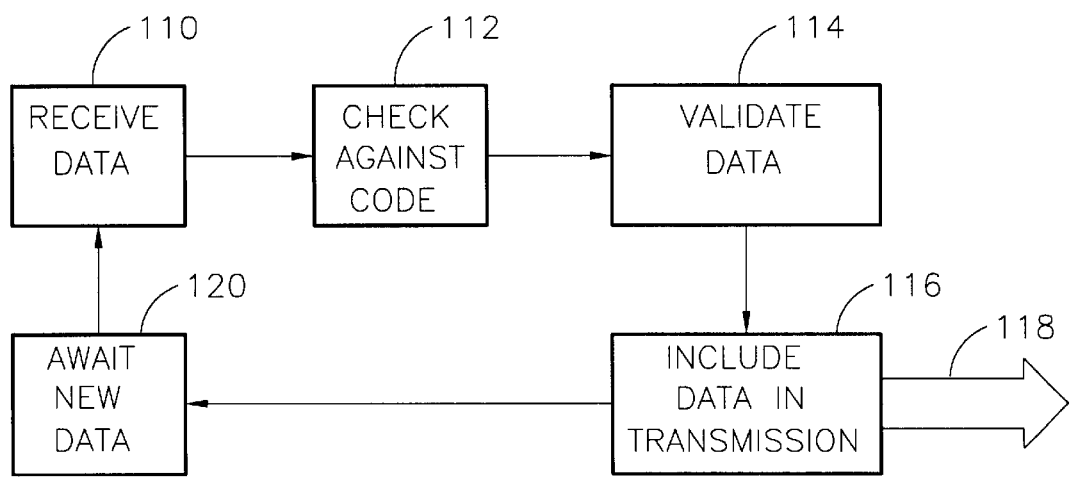

In FIG. 4a, the operations necessary for the TCAS COMPUTER 16 to undertake to perform the present invention are shown. Block 110 shows the receipt of data from either the MODE S TRANSPONDER or some directly connected subsystem such as a radar altimeter 17. When TCAS COMPUTER 16 receives the data, it will check to determine if the data is from the selected subsystem (that shown in area 34 of the control panel 12) as shown by block 112. The data is validated as shown in block 114 and is included in the data to be sent to the display as shown in block 116. The display data is then sent to the display as shown by arrow 118 and a flowback signal is sent to the "await new data" block 120.

Figure 4B:
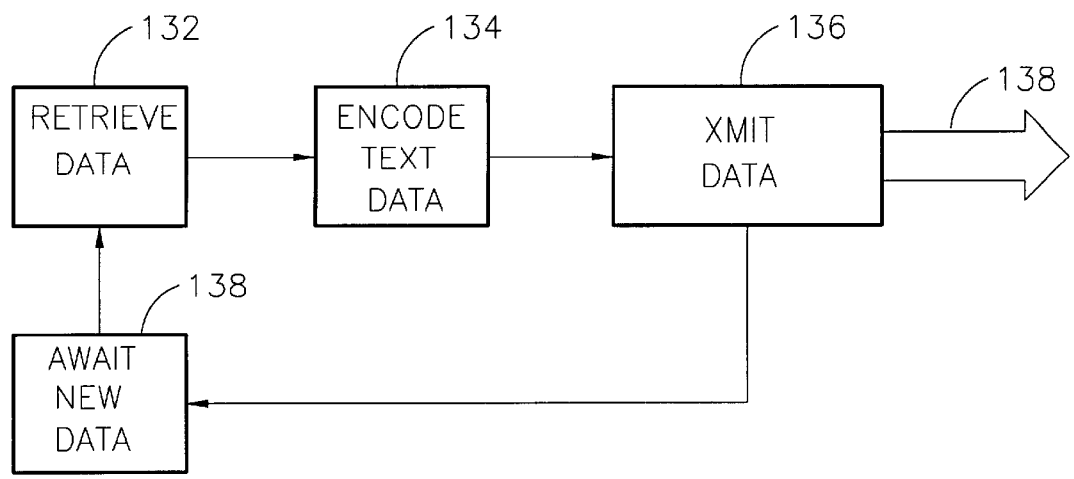

FIG. 4b shows the modification to the MODE S TRANSPONDER 14 to provide the new display features of the present invention. MODE S TRANSPONDER 14 waits for a command for new data as shown by block 130. Upon receipt of such a command (as for example by the user in setting the display in the area 32 of the control panel 12) the MODE S TRANSPONDER 14 retrieves the data as shown by block 132 and encodes it as test data as shown in block 134 after which it is transmitted from the "xmit data" block 136 to the TCAS COMPUTER 16 as shown by arrow 138. A flowback signal is also sent to the "await new data" block 130. In the event that the command is for a subsystem input such as the ADC, the MODE S TRANSPONDER 14 will have a program like the first two blocks of FIG. 4a. In other words, it will receive the data from the subsystem like in block 110, will determine if it is from the selected subsystem like in block 112 and will transmit it to the TCAS COMPUTER 16. Since the TCAS COMPUTER 16 will validate the data, the MODE S TRANSPONDER need not do so.

Figures 3C, 3D:
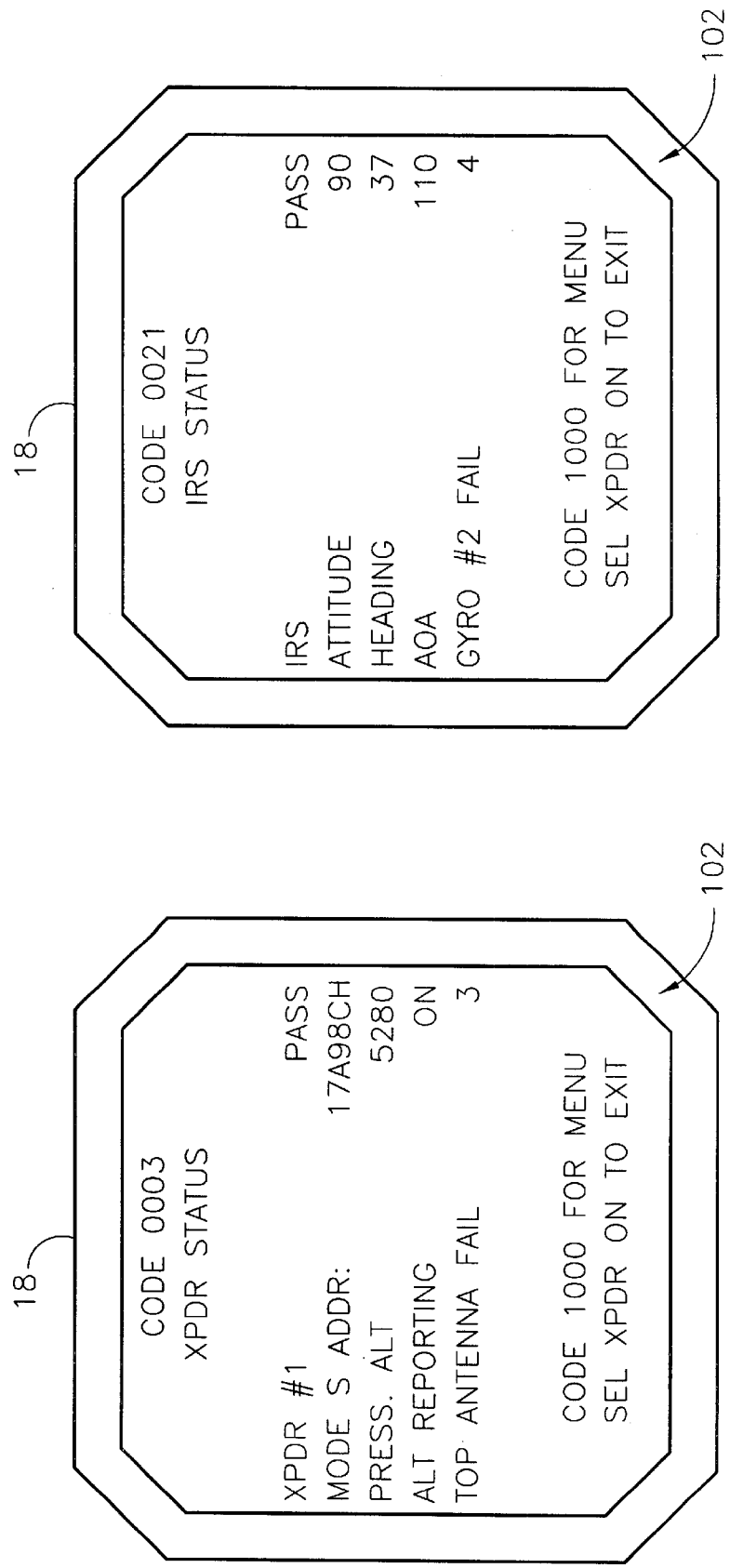

FIGS. 3b, 3c and 3d show examples of displays that can now be obtained using the present invention. In FIG. 3b, MODE S TRANSPONDER #1 has been selected (CODE 0003) and the text used with regard to MODE S TRANSPONDER #1 is shown. The first 6 lines of text and the last two are common to this display and do not change so long as CODE 0003 is selected. The first line identifies the code being used, the second shows that TRANSPONDER #1 is being used and that its present condition is "pass" (there are no present failures). Line 3 shows that the MODE S TRANSPONDER address is 17A98CH. Line 4 shows the altitude is a pressure altitude and is 5280 feet while line 6 shows that the altitude reporting feature is "on".

Line 7, shown by area 102, is unique to the program verification mode and shows that the software part number "S/W PN", identified as "PS7021601-001" is loaded in the MODE S TRANSPONDER #1. This display is all that is required to verify the software.

As will be explained in connection with FIG. 3c, other text data may be presented in line area 102 at line 7.

Lines 8 and 9 are instructions for use in returning to the main menu or to exit. Code 1000 brings the display back to the menu and the pilot should select "XPDR ON" to exit.

FIG. 3*c* shows another display which may be seen when the code 0003 is selected and after viewing the initial display shown in FIG. 3*b*. To view the display in FIG. 3*c*, the pilot or user would press the "IDENT" button 32 while still in CODE 0003. If there had been some failure in the TRANSPONDER or its associated subsystems during some previous leg of flight, such a failure would appear in the area 102 on line 7. In this case it will be assumed that on the third leg of the aircraft's flight, there was a failure in the top antenna. As such, area 102 on line 7 is shown to read "TOP ANTENNA FAIL 3". If there had been a failure in the Control Panel A during the 6th leg of flight, then the area 102 of line 7 would read "CONTROL PANEL A FAIL 6" Other text that could appear in area 102 on line 7 may be:

NO FAILURES
TRANSPONDER FAIL
ALTITUDE 1 FAIL
ALTITUIDE 2 FAIL
ALTITUDE COMP FAIL
CONTROL PNL A FAIL
CONTROL PNL B FAIL
TCAS BUS FAIL
ADLP BUS FAIL
MAINT BUS FAIL
FLIGHT ID BUS FAIL
INVALID ADDRESS
TOP ANTENNA FAIL
BOT ANTENNA FAIL
END FAIL LIST

Each time the user presses the "IDENT" button 32 a new failure would be indicated and the leg during which it occurred. Of course, the above list is by example and other data can also be displayed. If there were no failures, the area 120 on line 7 would read NO FAILURE" When "END FAIL LIST" appears, then there are no further failures to report.

With the present invention any or all of the of the above list may be inserted into area 102 on line 7 so that the history of the flight legs can be found and corrected as necessary.

FIG. 3*d* shows the display that might appear if the user had selected, for example, code 21 indicative of the Inertial Reference System (IRS 26 in FIG. 1). In FIG. 4*d*, the code appears on line 1, the IRS unit is identified on line 2, the status for IRS as "PASS" is shown on line 3, the aircraft attitude, heading and angle of attack might be shown on lines 4–6 and any failure e.g. GYRO #2 FAIL 4" might be shown on area 102 in line 7. The usual code to get to the menu and to exit are also shown on lines 8 and 9 as with the previous displays.

It is thus seen that we have provided a novel and economical way of displaying information in the aircraft collision avoidance system described without having to resort to additional computers on the aircraft. Many changes and modifications will occur to those skilled in the art. For example, the specific text used for the displays has been chosen for explaining the way the displays might appear and many other text displays or graphic information may be used instead.

The embodiments of the invention in which an exclusive property or right is claims are defined as follows:

1. The method of displaying data in a TCAS system including a control panel with movable control elements, a mode S transponder, a TCAS computer and a TCAS display, comprising the steps of.
   A. producing a desired display signal by manipulating certain predetermined ones of the control elements of the control panel;
   B. presenting the signal produced in step A. to the mode S transponder;
   C. combining the signal received in step B. with predetermined information in the mode S transponder and supplying the combined signal to the TCAS computer;
   D. comparing the combined signal received by the TCAS computer with the desired display signal to produce a verified signal; and
   E. transmitting the verified signal to the TCAS display for display thereof 2. The method of claim 1 including the further step of providing the mode S transponder with an external signal indicative of the predetermined information and step C. combines the signal received in step B, with the external signal.

3. The method of claim 2 wherein subsequent to step C. including the additional step of sending a signal back to the mode S transponder to await new data.

4. In a TCAS system including a control panel having a plurality of activatable elements thereon, a mode S transponder, a TCAS computer and a TCAS display, the improvement comprising:
   means generating a code dependent on the activation of predetermined elements of the control panel;
   means transmitting the code to the mode S transponder, the mode S transponder combining the code with predetermined information in the mode S transponder to provide a command signal;
   means transmitting the command signal to the TCAS computer, the TCAS computer detecting the code and producing a verified command signal in accordance therewith; and
   means transmitting the verified command signal to the TCAS display for display of the predetermined information.

5. The apparatus of claim 4 further including an external source of information connected to the mode S transponder to provide the predetermined information.

6. The apparatus of claim 4 wherein the predetermined information is text information indicative of a failure of a component of the TCAS system.

7. The apparatus of claim 5 wherein the predetermined information is text information indicative of a failure of a component of the external source.

* * * * *